United States Patent [19]

Hardee et al.

[11] 4,381,290

[45] * Apr. 26, 1983

[54] METHOD AND CATALYST FOR MAKING CHLORINE DIOXIDE

[75] Inventors: Kenneth L. Hardee, Middlefield; Arnold Z. Gordon, Lyndhurst; Charles B. Pyle, Chardon; Rajat K. Sen, Cleveland Heights, all of Ohio

[73] Assignee: Diamond Shamrock Corporation, Dallas, Tex.

[*] Notice: The portion of the term of this patent subsequent to Dec. 7, 1999, has been disclaimed.

[21] Appl. No.: 344,304

[22] Filed: Feb. 1, 1982

Related U.S. Application Data

[63] Continuation-in-part of Ser. No. 256,969, Apr. 23, 1981, Pat. No. 4,362,707.

[51] Int. Cl.$^3$ .............................................. C01B 11/02
[52] U.S. Cl. .............................. 423/478; 204/290 F; 252/466 PT
[58] Field of Search ............... 423/478; 204/101, 103, 204/98, 128, 290 F

[56] References Cited

U.S. PATENT DOCUMENTS

| | | |
|---|---|---|
| 2,936,219 | 5/1960 | Rapson ............................ 423/478 |
| 3,632,498 | 1/1972 | Beer ............................. 204/290 F |
| 3,711,385 | 1/1973 | Beer ................................ 204/59 |
| 3,853,739 | 12/1974 | Kolb ............................ 204/290 F |
| 3,884,777 | 5/1975 | Harke .............................. 204/84 |
| 3,904,495 | 9/1975 | Eng ............................... 204/101 |
| 3,904,496 | 9/1975 | Harke ............................ 204/103 |
| 4,129,484 | 12/1978 | Larsson .......................... 204/103 |
| 4,169,134 | 9/1979 | Isa ................................ 423/478 |
| 4,182,662 | 1/1980 | Hart .............................. 204/128 |

FOREIGN PATENT DOCUMENTS 1216447 12/1970 United Kingdom ............... 423/478

OTHER PUBLICATIONS

Mellor, *Inorganic and Theoretical Chemistry*, vol. XV, Longmans Green, NY, (1936), pp. 656-658.
Masschelein, "*Chlorine Dioxide*", Ann Arbor Science, 1979, pp. 122, 123.

*Primary Examiner*—Brian E. Hearn
*Attorney, Agent, or Firm*—Woodrow W. Ban

[57] ABSTRACT

A catalyst together with a heterogeneous catalytic method for making chlorine dioxide from an acid and a metal chlorate solution. The catalyst generally comprises at least one of a valve metal oxide, ruthenium oxide, iridium oxide, palladium oxide, platinum oxide and rhodium oxide.

17 Claims, No Drawings

METHOD AND CATALYST FOR MAKING CHLORINE DIOXIDE

RELATED U.S. APPLICATION DATA

This application is a continuation-in-part of U.S. Ser. No. 256,969 filed Apr. 23, 1981, now U.S. Pat. No. 4,362,707.

FIELD OF THE INVENTION

This invention relates to the production of chlorine dioxide and particularly to a catalyst and catalytic method for the production of chlorine dioxide.

BACKGROUND OF THE INVENTION

Chlorine dioxide is a desirable product applied diversely such as in formulating disinfectants and manufacturing paper products. Historically $ClO_2$ has been prepared commercially by a reaction between a metal chlorate in aqueous solution, such as sodium chlorate, and a relatively strong acid such as sulfuric, phosphoric or hydrochloric acid.

Examples of $ClO_2$ processes utilizing $H_2SO_4$ are shown in U.S. Pat. Nos. 4,081,520; 4,079,123; 3,933,988; and 3,864,456. Examples of $ClO_2$ processes utilizing HCl are shown in U.S. Pat. Nos. 4,079,123; 4,075,308; 3,933,987; 4,105,751; 3,929,974; and 3,920,801. A process for $ClO_2$ utilizing phosphoric acid is shown and described in U.S. Pat. No. 4,079,123.

Generally, these present processes for generating $ClO_2$ utilize an alkali metal chlorate containing feedstock, usually $NaClO_3$, that also includes a halide salt of the alkali metal. Sodium chlorate feedstock for such a $ClO_2$ process typically is generated by electrolysis of sodium chloride brine in any well-known manner. Spent brine typically accompanies sodium chlorate withdrawn from the electrolysis cells for use in an accompanying $ClO_2$ process.

In present $ClO_2$ processes, the mixture of brine and chlorate is generally fed to one or more reactors where the feedstock contacts a desired acid and reacts to form $ClO_2$. In these processes, a competing reaction occurs between the metal halide salt and the acid, producing $Cl_2$. The $Cl_2$ must be separated from the $ClO_2$ being generated. Frequently the $Cl_2$ is reacted to form metal chloride salt or HCl and is then recycled.

In some $ClO_2$ generation schemes, an additional reducing agent, such as $SO_2$ or methanol, is added to the mixture of the metal chlorate compound and acid. Yet for some such agents, like $SO_2$, the relative amount added must be carefully controlled. It has been reported that an excessive quantity of $SO_2$ causes evolution of significant additional $Cl_2$ at the expense of $ClO_2$ production. However, it is suggested that these reducing agents can reduce the evolution of $Cl_2$ when used in proper proportion.

The reaction between, for example, $NaClO_3$ and sulfuric acid is known to occur at ambient temperatures. This reaction at moderate temperatures, however, is slow and is therefore unacceptable in a commercial setting. One common method for elevating the reaction rate is to contact the reactants at an elevated temperature, usually between 40° C. and the boiling point of the particular reactant mixture being utilized. Often reduced pressure in the reactor is employed. Reduced pressure has been reported to have a beneficial impact upon the reaction rate, while lowering the boiling point of the reaction mass providing steam for diluting the $ClO_2$ product.

An elevated concentration of gaseous $ClO_2$ poses a serious safety risk. Generally between 10 and 15 percent is considered the maximum concentration desirable when handling gaseous $ClO_2$. It appears that the safe concentration declines as temperature is elevated. A variety of substances are known for diluting $ClO_2$ as it is produced, including air, steam, and chlorine.

One drawback common to present $ClO_2$ generation schemes is that the chlorate in an aqueous solution reacted with the acid is valuable. The chlorate must be herefore consumed substantially completely in order for the process to be economical. Since the rate of reaction of the metal chlorate with the acid is strongly a function of the concentration of each, it may be seen that significant reactor residence time can be required to satisfactorily exhaust a given volume of reactants of its metal chlorate content or a substantial quantity of spent reactants must be either recycled or disposed of. Catalysts, functioning to elevate the rate of reaction, could alleviate the impact of low reaction rates associated with operation to very low residual chlorate levels in the reaction mass.

Beyond the addition of reducing agents such as $SO_2$ or methanol, catilization of the chlorate-acid reaction has not been extensively developed. Vanadium pentoxide, silver, arsenic, manganese, and hexavalent chrome have been suggested as catalyst candidates in U.S. Pat. No. 3,563,702. It is suggested that these catalysts can reduce $Cl_2$ evolution from the competing reaction of the metal halide with the acid.

Electrolysis of a solution of a metal chlorate and a desired acid potentially offers a useful reaction rate improvement, particularly when processing to very low chlorate levels in the reactant solution. Electrodes utilized in such an electrolysis process would be exposed to a potentially damaging, strongly acidic environment. Therefore, development of a low overvoltage, long-lived electrode would appear essential to development of a commercially useful electolytic $ClO_2$ process using an acid and a chlorate for feedstock material. Use of electrolysis for $ClO_2$ generation does not appear to be substantially suggested or developed in prior patented art.

Electrocatalytic anode coatings for use in electrolytic chlorate or chlorine generating cells are known. Some of these coatings contain platinum group metals such as ruthenium or mixtures of platinum group metals and valve metals such as titanium. Typical chlorine or chlorate producing anode coatings are shown in U.S. Pat. Nos. 3,751,296; 3,649,485; 3,770,613; 3,788,968; 3,055,840; and 3,732,157. Use of such coatings upon cathodes for the generation of $ClO_2$ is not suggested.

There does not appear to be substantial development in the prior art of a relatively limited selection of platinum group metal combinations effective as either a catalyst for the generation of $ClO_2$ from a metal chlorate and an acid or as an electrocatalyst for the electrocatalytic generation of $ClO_2$ from the metal chlorate, and the acid has not been suggested.

DESCRIPTION OF THE INVENTION

The present invention comprises a heterogeneous catalyst and heterogenetic catalytic and electrocatalytic methods for the generation of chlorine dioxide from a mixture of a chlorate containing substance and an acid. The catalyst is a mixture of one or more platinum group metal oxides such as ruthenium oxide, iridium oxide, rhodium oxide, platinum oxide and palladium oxides. Generally, mixtures of two or more such oxides are preferred in practicing the invention. In such mixtures, the mole ratio of any platinum group metal oxide is generally greater than 0.01. In equally preferred embodiments, a valve metal oxide is blended with the platinum group metal oxide.

Chlorine dioxide is generated by contacting the heterogeneous catalyst with an acid and chlorate containing feedstock at a temperature of at least 20° C. The acid and chlorate containing feedstock results from combining a feedstock solution of an alkali or alkaline earth metal chlorate with an acid feedstock. Chlorine dioxide is recovered from the combined feedstocks.

Under an alternate preferred mode, an anode is provided in contact with the combined feedstocks, and a voltage is impressed between the anode and the catalyst. In a preferred electrocatalytic configuration, the catalyst composition is applied to an electrically conductive substrate to comprise a cathode. The catalyst composition in these cathode coatings is frequently applied to the cathode as a mixture of metal compounds readily oxidizable to yield the metal oxides present in the catalyst composition. After application, these readily convertable oxide precursors are then oxidized.

The above and other features and advantages of the invention will become apparent from the following detailed description of the invention.

BEST EMBODIMENT OF THE INVENTION

A heterogeneous catalyst made for the generation of chlorine dioxide in accordance with this invention is comprised of at least one platinum group metal oxide selected from oxides of ruthenium, rhodium, iridium, platinum, and palladium. The oxides are preferably substantially insoluable in feed streams contacting the catalyst during generation of chlorine dioxide.

Frequently these platinum group metal oxides are blended with one or more valve metals. Generally the larger proportion of such a resulting blended catalyst is comprised of the valve metal oxide. Valve metal is a common name for a film forming metal. Film forming metals include aluminum, titanium, zirconium, bismuth, tungsten, tantalum, niobium and mixtures or alloys of these metals. It is believed that the valve metal oxide in the catalyst composition may provide a foundational crystal matrix providing a positioning matrix upon which a crystal lattice of the platinum group metals is superimposed.

The valve metal preferred by far is titanium. Titanium offers a combination of corrosion resistance, relative cost effectiveness and relative ease of handling making it preferable, though not necessarily more effective, in implementing the instant invention.

The term platinum group metals includes platinum, iridium, osmium, ruthenium, rhodium, and palladium. In implementing the invention, the platinum group metal oxides are selected from a group consisting of ruthenium oxide, iridium oxide, rhodium oxide, palladium oxide and platinum oxide. The pairings of platinum group metal oxides shown in Table I have been found to be particularly effective in implementing the instant invention. These mixtures of platinum group metal oxides have been found equally preferable alone or mixed with a valve metal such as titanium dioxide in catalyzing a $ClO_2$ reaction. While individual platinum group metals alone produce a catalytic effect, the mixtures shown in Table I produce substantial elevations in the rate of generation of $ClO_2$ from chlorate and an acid making them preferred over single platinum group metal oxides.

TABLE I

| | |
|---|---|
| ruthenium oxide | - rhodium oxide |
| ruthenium oxide | - rhodium oxide - palladium oxide |
| ruthenium oxide | - palladium oxide |
| rhodium oxide | - palladium oxide |
| iridium oxide | - rhodium oxide |
| iridium oxide | - platinum oxide |

Generally for a mixture of platinum group metal oxides to be effective in catalyzing the reaction, it is necessary that each platinum group metal oxide be present in a mole ratio of not less than 0.01. For example, where ruthenium and rhodium are the platinum group metal oxides utilized in the catalyst, the rhodium should be present in a mole ratio to the ruthenium of at least 0.01. However, ratios as great as 100.0 provide acceptable catalyst performance depending upon the platinum group metal oxides utilized in preparing the catalyst. The relative mole ratio of platinum group metal oxides utilized in formulating a particular catalyst therefore can be a function of other variables such as availability and cost of the particular platinum group metals.

The catalyst is effective even when the platinum group metals are present as a very low percentage of the total catalyst weight, that is, as a very low percentage of the valve metal oxide. Some catalyst activity can be observed where even a very small quantity of the platinum group metals is present with the valve metal oxides.

The catalyst is capable of being utilized in unsupported form, but it is generally preferable that the catalyst be supported in a suitable or conventional manner. Suitable catalyst supports would include ceramic, carbon and metals not susceptible to chemical attack by or dissolution in the system being catalyzed. One such metal support type would be those fabricated from the valve metals. However, the role of the valve metals in supporting the catalyst is distinguishable from the role of the valve metal oxide in comprising a portion of the catalyst mixture.

Catalyst mixtures typically are formed by common solvation of precursor compounds to the metal oxides followed by application of the common solutions to the support with subsequent oxidation of the metal oxide precursor to the metal oxide. Such application methods are well-known in the art, one typical method being shown and described in U.S. Pat. No. 3,751,296. For example, ruthenium and palladium chlorides can be dissolved in an alcohol, painted upon the catalyst support and then fired in an oxygen containing atmosphere at in excess of 500° C.

It is contemplated that any catalyst utilized in accordance with this invention for generating $ClO_2$ be substantially insoluable in the feed materials from which $ClO_2$ is generated. That is, the catalyst should remain affixed to its support so as to provide a heterogeneous catalytic system. Methods for producing oxides of platinum group metals upon the catalyst support where those oxides would be rendered soluble should be avoided.

The catalyst is utilized to catalyze a reaction between a chlorate containing solution and an acid, usually a strong acid such as sulfuric, hydrochloric, or phosphoric acids. Typically the chlorate containing solution is an aqueous solution of sodium or potassium chlorate as such solutions are available commercially. The chlorate containing, readily disassociable, solution could equally be a solution of any suitable or conventional metal chlorate such as an alkali or alkaline earth metal chlorate, chlorates of lithium, rubidium, cesium, berryllium, magnesium, calcium, strontium and barium are also candidates for use with the catalyst.

In the best embodiment, sodium chlorate is reacted with sulfuric acid to generate the chlorine dioxide. Generally the reaction is believed to be:

$$4NaClO_3 + 2H_2SO_4 \rightarrow 4ClO_2 + O_2 + 2Na_2SO_4 + 2H_2O$$

The rate of reaction is dependent at least upon the concentration of both the metal chlorate and the acid. Temperature is also a reaction rate factor.

A sodium chlorate containing feedstock is generally combined with an aqueous $H_2SO_4$ feedstock for reaction in the presence of the catalyst. The combined feedstock contains $NaClO_3$ between about ½ molar and saturation and $H_2SO_4$ between about ⅓ molar and about 18 molar. $NaClO_3$ saturation depends in part upon the temperature of the reactant feedstock.

It has been found workable that for most applications, the $NaClO_3$ strength be between about ½ molar and about 7 molar, and the $H_2SO_4$ strength be between about 2 molar and 10 molar. The feedstock reacts in the presence of the catalyst to yield $ClO_2$ at ambient temperature. Superior catalytic results are obtained where the temperature of the reacting feedstock exceeds about 20° C. and preferably exceeds about 40° C.

Good contact between the combined feedstocks and the catalyst is beneficial to the catalyst activity. Suitable or conventional methods to improve contact, such as agitation or the like, may be appropriate.

Mixtures of titanium dioxide, ruthenium oxide and rhodium oxide have been found most effective in catalyzing the $ClO_2$ reaction. A mixture of ruthenium oxide, titanium dioxide and palladium oxide and mixtures of iridium oxide with rhodium oxide or platinum oxide have been found to be about equally effective as catalysts, but less effective than the ruthenium rhodium mixture. Mixtures of rhodium oxide and palladium oxide have been found to be very effective as catalysts, as have ruthenium-rhodium-palladium mixtures. Mixtures of these platinum group metals with alumina in lieu of titanium dioxide have been found also to be effective as catalysts.

$ClO_2$ evolved in the reaction can be stripped from the liquid reaction medium in any suitable or conventional manner such as by sparging a gas through the media. In addition, oxygen evolved during the reaction assists in effecting this stripping. Care must be exercised in stripping the $ClO_2$ since elevated concentration levels in the gaseous state can pose an explosion hazard.

Where chloride ions are contained in combined feedstock contacted with the catalyst, some chlorine is evolved. Chloride ions typically can arise from residual NaCl accompanying an $NaClO_3$ containing solution withdrawn from a diaphragm electrolytic chlorate cell or may be deliberately added in many conventional processes. Typically this chlorine is separated and recycled for conversion to NaCl or HCl and reuse in the chlorate generating electrolytic cell. However, where relatively chloride free chlorate is available, $ClO_2$ essentially free of chlorine is produced using the catalyst of the instant invention.

In an alternate to the best embodiment, an anode is provided in contact with the combined feedstock contacting the catalyst. A voltage is impressed between the anode and the catalyst. The chlorate is thereby electrolyzed to $ClO_2$ at the catalyst surface.

Electrolysis is generally conducted in a suitable or conventional electrolysis cell. The catalyst performs in such cells as a cathode or cathode coating. Where the electrolysis cell includes a more conventional cathode such as a reticulate or a sheet cathode, the catalyst provides an electrocatalytic surface on the cathode. Where the cathode is of a relatively less conventional configuration such as: (a) a particulate bed wherein cathode particles circulate in occasional contact with a cathodic current feeder, or (b) a so-called ECO cell, the catalyst may coat a cathode particle substrate or may comprise the cathode particle entirely where the cathode is in particulate form.

The cathode can be of any suitable or conventional material. Metals selected for use should be resistant to corrosive effects of the acid and the metal chlorate. Imposition of a mild voltage through the cell sufficient to electrolyze the $ClO_3^-$ to $ClO_2$ may provide some limited cathodic protection for metals that otherwise would be adversely effected by chemical conditions within the cell. However, a wide variety of construction materials are otherwise available including generally: the valve metals; carbon; ceramic, but generally only for a particulate cathode; steels including the stainless steels; Periodic Table Group 8 metals including iron, cobalt, nickel and the platinum group metals; the Periodic Table Group 4A metals tin and lead; and the Periodic Table Group 1B metals silver and gold; chromium, and molybdenum.

The theoretical voltage required is 1.15 volts for the electrochemical reaction $4NaClO_3 + 2H_2SO_4 \rightarrow 4ClO_2 + O_2 + 2Na_2SO_4 + 2H_2O$. Some overvoltages are encountered, their magnitude varying with different electrode materials of construction, electrode spacing in the cell, conductivity variations of the reactants being electrolyzed and the like.

Where chlorine dioxide is to be produced electrolytically from sodium chlorate and sulfuric acid, sodium chlorate concentration in the combined feedstocks can range between about 1/10 molar and saturation and the sulfuric strength in the combined feedstocks can range between ⅓ molar and 18 molar, with 2 to 10 molar being preferred.

Sulfuric acid is particularly desirable for use in either the catalyzed or electrochemical reaction, since one by-product is then $Na_2SO_4$, readily disposed of in the marketplace. However, use of phosphoric acid produces acceptable $ClO_2$ generation rates.

Using the catalysts and process of this invention, a significant rate increase can be observed in reacting chlorate-acid mixtures at temperatures as low as 20° C. However, for the simple catalytic reaction, it has been found preferable that the reaction temperature be at least 40° C. and most preferably at least 60° C. to achieve commercially attractive results.

The electrolytically activated reaction occurs satisfactorily at temperatures even below 20° C. Again for reasons of commercial viability, it is generally advantageous to operate electrolytic cells of this invention at temperatures in excess of 20° C. and preferably in excess of 40° C.

Either the catalytic or electrolytic methods of this invention can be operated at a more elevated temperature, one primary limitation being the boiling point of the reacting mixture of acid and chlorate. Reaction under pressure would allow a further elevated reaction temperature, giving due deference to the potentially explosive nature of the $ClO_2$ concentrations being produced.

In practical effect then, operation is generally advantageous in a temperature range of from 20° C. to about 90° C. and preferably from about 40° C. to about 90° C.

One major advantage of the instant invention is that the catalyst provides the opportunity to achieve commercially economical reaction rates at a significantly lower reacting temperature and in substantially dilute chlorate solutions.

The following examples are offered to further illustrate the features and advantages of the invention.

EXAMPLE I

A 5 centimeter by 12 centimeter rectangle of 0.020" thick titanium sheet stock was etched by boiling in 20 percent HCl.

A catalyst precursor solution was prepared comprising 1.077 grams $RuCl_3$, 1.39 grams $RhCl_3.3H_2O$, 0.93 milliliters tetra ortho butyl titanate (TBOT), 16.76 ml butanol, and 1.0 ml HCl (20° Be).

Twelve coats of the catalyst precursor solutions were applied to one side of the sheet. The sheet was dried at 120° C. for 3 minutes and then baked at 500° C. for 10 minutes following each coating application.

170 milliliters of a 10 normal $H_2SO_4$ and 1.48 molar $NaClO_3$ solution were added to a glass reaction vessel and heated to 60° C. Argon gas was bubbled continuously through the solution, and gases escaping the solution were collected and passed through 100 milliliters of 1.0 molar potassium iodide. Uncatalyzed reaction and collection of the resulting off gas continued for 17 minutes and yielded a rate of $ClO_2$ production of $3.51 \times 10^{-10}$ moles/second/milliliter of solution.

A 1 centimeter $\times$ 5 centimeter section of the coated titanium sheet was then introduced into the solution. $ClO_2$ produced in the solution again was removed by argon sparging and captured in potassium iodide for 18 minutes. The rate of catalyzed $ClO_2$ production was calculated, and the rate of evolution of $ClO_2$ from the blank solution was subtracted to yield a catalyzed rate of $ClO_2$ production of $2.06 \times 10^{-8}$ moles/second/square centimeter.

The experiment was repeated at various temperatures to yield the following data:

| Temperature | Uncatalyzed rate $\frac{moles}{sec\ ml}$ | Incremental catalyzed rate moles/sec/cm$^2$ |
| --- | --- | --- |
| 45° C. | $1.2 \times 10^{-11}$ | $5.2 \times 10^{-9}$ |
| 60° C. | $3.51 \times 10^{-10}$ | $2.06 \times 10^{-8}$ |
| 90° C. | $4.62 \times 10^{-9}$ | $2.24 \times 10^{-7}$ |

As may be seen at the lower temperatures, the effective rate of reaction of the 170 milliliter sample was increased by at least about an order of magnitude.

EXAMPLE II

A 5.0 centimeter by 10 centimeter sheet of 0.020" thick titanium was etched in boiling 20 percent HCl. A solution of coating precursors was prepared comprising 0.359 grams $RuCl_3$, 2.316 grams $RhCl_3.3H_2O$, 0.88 grams tetra ortho butyl titanate, 16.76 milliliters butanol and 1 milliliter of 20° Be HCl.

The sheet was coated with the solution using a procedure identical with that of Example I.

Sulfuric acid and sodium chlorate were blended to produce an aqueous electrolyte of 5 molar $H_2SO_4$ and 2.0 molar $NaClO_3$. The electrolyte was introduced into an electrolytic cell. The coated strip was operated as a cathode in the cell, immersed in the electrolyte at 60° C. at a current density of about 0.65 amps per square inch as measured at the coated strip surface. The $ClO_2$ being generated was stripped from the electrolyte using an argon gas sparge and was collected in 0.5 molar potassium iodide. A comparison of the current utilized in producing a given quantity of the product $ClO_2$ with the theoretical current necessary to produce that amount of $ClO_2$ yielded a current efficiency of 94 percent.

EXAMPLE III

A 2-inch diameter by ¼" thick catalyst support of a generally honeycomb structure was provided made of a ceramic commercially available as CELCOR ®, a product of Corning. A solution of coating precursor was prepared including 0.718 grams $RuCl_3$, 1.852 grams $RhCl_3.3H_2O$, 0.93 milliliters of tetra ortho butyl titanate, 16.76 grams of butanol, and 1.0 ml of 20° Be HCl.

One coating of the catalyst precursor solution was applied to the CELCOR catalyst support which was then dried at 120° C. for 3 minutes and subsequently baked at 520° C. for 10 minutes.

The coated structure was arranged in a vessel whereby fluid could be pumped through the honeycomb. An aqueous solution of 10 normal $H_2SO_4$ and 2.0 normal $NaClO_3$ at 70° C. was then pumped through the honeycomb structure. $ClO_2$ generated was stripped from the aqueous solution and collected in potassium iodide. Back titration of the KI solution after a predetermined period of collection yielded a $ClO_2$ generation rate of $1.7 \times 10^{-7}$ moles/second/square centimeter after correction for $ClO_2$ evolution from the same aqueous solution flowing through a noncatalytically coated support.

EXAMPLE IV

A coating solution was prepared including 0.88 milliliters of tetra ortho butyl titanate, 2.0 milliliters HCl (20° Be), 16.8 milliliters butanol, 0.408 grams $PdCl_2$, and 0.543 grams $RuCl_3$. Eight coatings of the solution were applied to a 1" alumina disk with each coating being dried for 3 minutes at 120° C. and then baked for 10 minutes at 520° C. after application.

An aqueous solution of 10 normal $H_2SO_4$ and 2.0 molar $NaClO_3$ was heated to 78° C. 150 milliliters of the aqueous solution were segregated while maintaining the 78° C. temperature with argon being bubbled through the 150 ml volume to strip out $ClO_2$ being generated. Collected in KI, the $ClO_2$ production was measured at $3.1 \times 10^{-9}$ moles/second/milliliters. The coated alumina disk was then immersed in the 150 milliliters of solution, $ClO_2$ generated being again collected in KI. After correction for generation without the catalyst being present, the catalytic rate was found to be $8.8 \times 10^{-8}$ moles/second/square centimeter of catalytic surface.

EXAMPLE V

The supported catalyst of Example III was immersed in an aqueous solution of 5 normal $H_2SO_4$ and 2 molar $NaClO_3$ at 85° C. for 3 hours and 20 minutes. $ClO_2$ produced was stripped from the aqueous solution using argon gas and collected in 1.0 molar KI. $ClO_3^-$ consumption from the aqueous solution was found by back titration. The yield was determined to be 100 percent of theoretical.

EXAMPLE VI

A catalyst precursor solution was prepared by mixing:
  0.3166 grams $RhCl_3.3H_2O$
  0.3484 grams $IrCl_3$
  0.5 milliliters of ortho butyl titanate
  8.4 milliliters butanol
  1 milliliter of 20° Be HCl A 5 centimeter×10 centimeter×0.02 inch titanium sheet was etched by boiling in 20° Be HCl. Seven coatings of the precursor mixture were applied to the sheet, each coating being dried at 120° C. for 3 minutes. The sheet was baked at 520° C. for 10 minutes.

5 Molar $H_2SO_4$ and 2 molar $NaClO_3$ at 60° C. were reacted to produce $ClO_2$. The $ClO_2$ evolved was removed by sparging argon gas into the acid and chlorate reactants. $ClO_2$ was evolved at $2.23\times10^{-10}$ moles/second/milliliters as determined by collection in KI.

A 1 centimeter×5 centimeter section of the sheet was introduced into the reaction with ClO evolved from the reactants being collected in KI. After adjustment for $ClO_2$ evolution from the uncatalyzed reaction, the catalysis rate was determined to be $1.6\times10^{-8}$ moles/second/centimeter squared.

EXAMPLE VII

A 5 centimeter×10 centimeter×0.02 inch titanium sheet was etched by boiling in 20° Be HCl. A coating precursor solution was prepared by making a mixture of:
  0.5948 grams $H_2PtCl_6.6H_2O$
  0.3483 grams $IrCL_3$
  0.5 milliliters of ortho butyl titanate
  8.4 milliliters butanol
  1 milliliter of 20° Be HCl The sheet was coated with this mixture in accordance with Example VI.

325 Milliliters of the solution of Example VI were maintained at 80° C. with any $ClO_2$ being evolved collected in KI. Argon was sparged into the reactants to assist in removal and recovery of $ClO_2$. Uncatalyzed $ClO_2$ evolution was determined to be $1.12\times10^{-9}$ moles/second/milliliter.

A 1 centimeter×5 centimeter section of the sheet was then introduced into the reactant mixture. $ClO_2$ evolved from the reactants was again collected in KI and the evolution rate was corrected for uncatalyzed $ClO_2$ evolution. The catalysis rate of $ClO_2$ was determined to be $3.9\times10^{-8}$ moles/second/sequare centimeter.

EXAMPLE VIII

A centimeter×10 centimeter×0.02 inch titanium sheet was etched in boiling 120° Be HCl. A coating precursor mixture was prepared of:
  1.0633 grams $RhCl_3.3H_2O$
  0.6054 grams $RuCl_3$
  13.5 milliliters butanol
  2.0 milliliters of 20° Be HCl The sheet was coated with the solution in a manner as shown in Example VI.

A reactant mixture of 2 molar $H_3PO_4$ and 2 molar $NaClO_3$. 325 Milliliters of the reactant mixture was maintained at 80° C. $ClO_2$ evolving from the mixture was recovered in KI. Argon gas was sparged into the reactant to assist in $ClO_2$ removal. Uncatalyzed evolution was determined to be $1.84\times10^{-11}$ miles/second/milliliter.

A 1 centimeter by 5 centimeter section of the sheet was introduced into the reactants. $ClO_2$ evolved was again recovered in KI for 10 minutes and connected for the uncatalyzed evolution of $ClO_2$. The catalyzation rate was determined to be $7.97\times10^{-9}$ moles/second/square centimeter.

EXAMPLE IX

Other catalyst mixtures were prepared generally in accordance with Examples I-VII but without ortho butyl titanate. Coatings resulting from these mixtures contained no titanium dioxide arising from the precursor solution. Catalyzation rates for these catalysts were determined generally in accordance with Examples I-VII in 5 molar $H_2SO_4$ and 2 molar $NaClO_3$. The catalyzation rates at 60° C. and 80° C. in gram moles $ClO_2$/second/square centimeter×$10^7$ are shown in Table II.

TABLE II

| Catalyst Compounds | Catalyst Compound Mole Ratio | Rate 60° C. | Rate 80° C. |
|---|---|---|---|
| Ru/Rh | 2/1 | 0.566 | 1.01 |
| Ru/Rh | 1/2 | 0.913 | 1.85 |
| Ru/Pd | 2/1 | 0.394 | 1.47 |
| Ru/Pd | 1/2 | 0.207 | 0.186 |
| Rh/Pd | 2/1 | 0.575 | — |
| Rh/Pd | 1/2 | 0.173 | 0.947 |
| Ru/Rh/Pd | 1/1/1 | 0.403 | 0.390 |

While a preferred embodiment of the invention has been described in detail, it will be apparent that various modifications or alterations be made therein without departing from the spirit and scope of the invention as set forth in the appended claims.

What is claimed is:

1. A heterogeneous catalytic process for the generation of $ClO_2$ comprising the steps of:
   (1) providing a chlorate containing feedstock selected from a group consisting of aqueous solutions of alkali metal chlorates and alkaline earth metal chlorates;
   (2) providing an acid feedstock;
   (3) providing a heterogeneous catalyst substantially insoluble in the feedstocks comprising at least one of ruthenium oxide, iridium oxide, palladium oxide, rhodium oxide and platinum oxide;
   (4) combining the feedstocks and reacting the combined feedstocks in contact with the catalyst at a temperature greater than 20° C.; and
   (5) stripping and recovering $ClO_2$ from the combined feedstocks.

2. The method of claim 1 wherein the acid is one of aqueous $H_2SO_4$ and aqueous phosphoric acid.

3. The method of claim 1 wherein the chlorate containing feedstock is $NaClO_3$ and the combined feedstock contains $NaClO_3$ in a range of concentration of between ⅓ molar and 7 molar, and $H_2SO_4$ in a concentration range between ⅓ molar and 18 molar.

4. The method of claim 1 wherein the combined feedstocks are contacted with the catalyst at a temperature in excess of about 40° C.

5. A process for the generation of $ClO_2$ comprising the steps of:
   (1) providing a chlorate containing feedstock selected from a group consisting of aqueous solutions of alkali metal chlorates and alkaline earth metal chlorates;
   (2) providing an acid feedstock;
   (3) providing a heterogeneous catalyst substantially insoluble in the feedstocks comprising a mixture of a valve metal oxide and at least one of ruthenium oxide, iridium oxide, palladium oxide, rhodium oxide and platinum oxide;
   (4) combining the feedstocks and reacting the combined feedstocks in contact with the catalyst at a temperature greater than 20° C.; and
   (5) stripping and recovering $ClO_2$ from the combined feedstocks.

6. The method of claim 5 wherein the acid is one of aqueous $H_2SO_4$ and aqueous phosphoric acid.

7. The method of claim 5 wherein the chlorate containing feedstock is $NaClO_3$ and the combined feedstock contains $NaClO_3$ in a range of concentration of between ⅓ molar and 7 molar, and $H_2SO_4$ in a concentration range between ⅓ molar and 18 molar.

8. The catalyst of claim 5 wherein the valve metal oxide is alumina.

9. The method of claim 5 wherein the valve metal oxide is titanium dioxide.

10. A process for the generation of $ClO_2$ comprising the steps of:
    (1) providing an aqueous mixture of an acid and a chlorate selected from a group consisting of alkali metal chlorates and alkaline earth metal chlorates;
    (2) contacting the aqueous mixture with a heterogeneous catalyst substantially insoluble in the feedstocks comprising a mixture of platinum group metal oxides selected from a group of mixtures consisting of ruthenium-rhodium, ruthenium-palladium, iridium-rhodium, iridium-platinum, palladium-rhodium, and ruthenium-rhodium-palladium, each platinum group constituent of the mixture being present in a mole ratio of not less than 0.01;
    (3) maintaining the catalyst and aqueous mixture at a temperature greater than 20° C.; and
    (4) stripping and recovering $ClO_2$ from the contacted mixtures.

11. The process of claim 10 wherein the platinum group constituents are ruthenium oxide and rhodium oxide.

12. The method of claim 10 wherein the temperature is maintained at greater than 40° C.

13. The method of claim 10 wherein the catalyst comprises a blend of a valve oxide with a platinum group metal oxide mixture selected from a group consisting of ruthenium-rhodium, ruthenium-palladium, iridium-rhodium, iridium-platinum, palladium-rhodium, and ruthenium-rhodium-palladium, each platinum group constituent of the mixture being present in a mole ratio of not less than 0.01.

14. A process for the generation of $ClO_2$ comprising the steps of:
    (1) providing an aqueous mixture of $H_2SO_4$ and $NaClO_3$;
    (2) contacting the aqueous mixture with a heterogeneous catalyst substantially insoluble in the feedstocks comprising a mixture of platinum group metal oxides selected from a group of mixtures consisting of ruthenium-rhodium, ruthenium-palladium, iridium-rhodium, iridium-platinum, palladium-rhodium, and ruthenium-rhodium-palladium, each platinum group constituent of the mixture being present in a mole ratio of not less than 0.01;
    (3) maintaining the catalyst and the aqueous mixture at a temperature greater than 20° C.; and
    (4) stripping and recovering $ClO_2$ from the contacted mixtures.

15. The process of claim 14 wherein the platinum group constituents are ruthenium oxide and rhodium oxide.

16. The method of claim 23 wherein the temperature is maintained at greater than 40° C.

17. The method of claim 16 wherein the catalyst comprises a blend of a valve metal oxide with a platinum group metal oxide mixture selected from a group consisting of ruthenium-rhodium, ruthenium-palladium, iridium-rhodium, iridium-platinum, palladium-rhodium, and ruthenium-rhodium-palladium, each platinum group metal constituent of the mixture being present in a mole ratio of not less than 0.01.

* * * * *